United States Patent [19]

Holtrop et al.

[11] Patent Number: 4,557,970
[45] Date of Patent: Dec. 10, 1985

[54] LAMINATE STRUCTURE WITH IMPROVED ACOUSTICAL ABSORPTION

[75] Inventors: James S. Holtrop, South Windsor, Conn.; Richard P. Maurer, Wilbraham, Mass.

[73] Assignee: Monsanto Company, St. Louis, Mo.

[21] Appl. No.: 647,311

[22] Filed: Sep. 4, 1984

Related U.S. Application Data

[63] Continuation-in-part of Ser. No. 553,594, Nov. 21, 1983, Pat. No. 4,476,183.

[51] Int. Cl.[4] .................... B32B 5/32; B32B 7/12
[52] U.S. Cl. ........................ 428/316.6; 428/317.1; 428/318.4
[58] Field of Search ............ 428/233, 236, 238, 239, 428/246, 252, 282–284, 286–288, 296, 304.4, 316.6, 317.1, 317.5, 317.7, 318.4, 319.3, 319.7, 319.9, 319.1

[56] References Cited

U.S. PATENT DOCUMENTS

| | | | |
|---|---|---|---|
| 3,303,086 | 2/1967 | Demers | 428/319.3 |
| 3,355,535 | 11/1967 | Hain et al. | 264/321 |
| 3,531,367 | 9/1970 | Karsten | 428/317.7 |
| 3,562,085 | 2/1971 | Crandal et al. | 428/316.6 |
| 3,565,746 | 2/1971 | Stevens | 428/316.6 |
| 3,654,063 | 4/1972 | Blackburn et al. | 428/304.4 |
| 3,755,063 | 8/1973 | Massey et al. | 428/319.7 |
| 3,787,259 | 1/1974 | Kleinfeld et al. | 156/78 |
| 3,817,818 | 6/1974 | Riding et al. | 428/316.6 |
| 3,833,259 | 9/1974 | Pershing | 428/316.6 |
| 3,930,917 | 1/1976 | Esakov et al. | 428/319.1 |
| 4,065,596 | 12/1977 | Groody | 428/215 |
| 4,147,828 | 4/1979 | Heckel et al. | 428/255 |
| 4,167,824 | 9/1979 | Wolpa | 428/316.6 |
| 4,388,363 | 6/1983 | Fountain | 428/215 |
| 4,476,183 | 10/1984 | Holtrop et al. | 428/286 |
| 4,489,126 | 12/1984 | Holtrop et al. | 428/246 |

FOREIGN PATENT DOCUMENTS

| | | | |
|---|---|---|---|
| 1625422 | 7/1970 | Fed. Rep. of Germany | 428/316.6 |
| 2906259 | 8/1980 | Fed. Rep. of Germany | 428/319.7 |
| 1362035 | 4/1964 | France | 428/316.6 |

*Primary Examiner*—William J. Van Balen
*Attorney, Agent, or Firm*—Thomas E. Kelley; Arthur E. Hoffman

[57] ABSTRACT

A laminate structure with improved acoustical absorption is provided which has a first and a third layer of foamed thermoplastic material and a second layer, intermediate the first and third layers, which is a material having acoustical properties different from the properties of the material of the first and third layers. A portion of the surface area of each layer is adhesively bonded to the adjacent layer. A sheet of paper or fabric is adhesively bonded to at least the outer surfaces of the first and third layers.

4 Claims, 2 Drawing Figures

LAMINATE STRUCTURE WITH IMPROVED ACOUSTICAL ABSORPTION

This application is a continuation in part of copending application Ser. No. 553,594, filed Nov. 21, 1983, now U.S. Pat. No. 4,476,183 incorporated herein by reference.

This invention relates to thermoplastic materials, and particularly to materials comprising foamed thermoplastic resins having substantially improved sound attenuation properties. More particularly this invention relates to a laminate structure formed from at least two foamed thermoplastic resins which exhibits improved sound absorption characteristics. This invention also relates to the use of the laminate of this invention in building construction to provide a quieter living and working spaces with improved noise attenuation across walls and floors.

BACKGROUND OF THE INVENTION

It has been desired for many years to reduce the noise impinging upon individuals at home, at work, and in the multitude of other places in which people find themselves. In addition to regulations under the Federal Occupational Safety and Health Act to reduce noise levels in the workplace, certain municipalities are changing building codes, adopting stricter standards and imposing new specifications for party walls and interior floor/ceiling assemblies between apartments.

For many years increasing the mass density of a wall was considered as being the only way to improve the sound attenuation characteristic of structures. It was then found that separating the two halves of the wall construction produced a slight degree of sound reduction and filling the cavity between the two halves with a low density soundwave-absorbing membrane such as mineral wool further increased the sound reduction. A further increase in the reduction of sounds in structures was realized when it was found that thermoplastic foams when constructed in certain forms have a degree of sound resistance and inhibit to some extent the transmission of noise from one area to an adjacent area. However, it is also known that current thermoplastic foam constructions are subject to resonant short-comings which create areas where substantial loss of sound attenuation occurs throughout a broad frequency spectrum.

A recent development which has found some acceptance for floor/ceiling noise attenuation is a space filling mat of widely-spaced, three-dimensional, nylon non-woven matting covered on one face by a fabric. An example of this construction is the Enkasonic TM matting produced by American Enka Company.

Foamed thermoplastic laminates have also been used in automobiles, particularly in the headliners. These foamed thermoplastic laminates are most often formed with the foamed thermoplastic material enclosed between outer facings. An example of this construction is the Fome-Cor ® board produced by Monsanto Company which is a polystyrene foam which has a kraft liner board facing on each side. The Fome-Cor ® board would be prepared for use by die-cutting and scoring or by pressing the board and applying a resin to fix the pressed shape. In an alternative construction a styrene-maleic anhydride foam sheet is covered with a thermoplastic polymer skin. A decorative trim was often applied to the automotive interior side of the headliner. This decorative trim has typically been a thin layer of polyurethane foam covered with cloth or vinyl.

SUMMARY OF THE INVENTION

The laminate structure of this invention has first and third layers of a foamed thermoplastic material which have an inner surface and an outer surface. A second layer of material, which has different acoustical characteristics from the foamed thermoplastic material of the first and third layers, is intermediate the first and third layers and at least a portion of the second layer is adhesively bonded to the inner surfaces of the first and third layers of foamed thermoplastic material. A sheet of paper, fabric or thermoplastic film is adhesively bonded to at least the outer surfaces of the first and third layers of foamed thermoplastic material.

DESCRIPTION OF PREFERRED EMBODIMENTS

The laminate structure of this invention may be further described as having first and third layers of a foamed thermoplastic material, such as foamed polystyrene, which have an inner surface and an outer surface. A second layer of foamed thermoplastic material, such as foamed polyurethane or foamed polystyrene which is treated to have acoustical properties different from the properties of the foamed thermoplastic material which forms the first and third layers, is intermediate the first and third layers of thermoplastic material. At least a portion of the second layer is adhesively bonded to the inner surfaces of the first and third layers of thermoplastic material. A sheet of paper, fabric or thermoplastic film is adhesively bonded to at least the outer surface of the first and third layers of foamed thermoplastic material.

Figure 1:
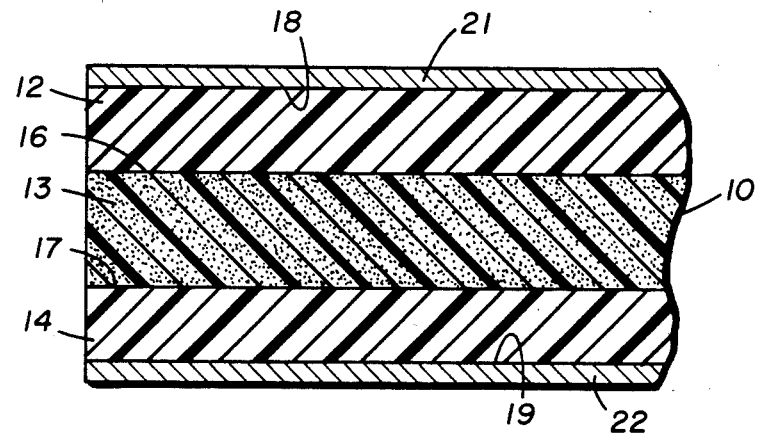
FIGS. 1 and 2 are side views of laminate structures of this invention.

Turning now to FIG. 1, a side view of one embodiment of the laminate structure of this invention is shown. The laminate structure 10 has a first layer of thermoplastic material 12 and third layer of thermoplastic material 14. In the following description, both the first layer 12 and third layer 14 are fabricated from the same foamed thermoplastic material; however, the first and third layers may be fabricated from different foamed thermoplastic materials. A second layer of material 13 is located intermediate the first and third layers of thermoplastic material 12 and 14. It is preferred that the second layer 13 be fabricated from a second thermoplastic material, that is a material different from the material used for the first layer 12 and the third layer 14. The thermoplastic materials utilized for the first layer 12, second layer 13, and third layer 14 are produced as a formed material in a manner that is well-known and will not be further described herein. The first layer 12 and third layer 14 of thermoplastic material each have an inner surface, 16 and 17 respectively, and an outer surface, 18 and 19 respectively. The inner surface 16 of first layer 12 and the inner surface 17 of third layer 14 are in contact with the surfaces of second layer 13 which is located intermediate the first and third layers 12 and 14 and such surfaces may be bonded together. This bonding is most easily achieved by applying an adhesive to the surfaces before the surfaces come in contact with one another. The adhesive may coat the entire surface area of inner surface 16 and inner surface 17, as well as the surfaces of the second layer of thermoplastic material 13; however, it is preferable that the adhesive only be applied to a portion of the surfaces such that only a portion of the second layer 13 is bonded to the first layer 12 and third layer 14 while the remainder of the surfaces are adjacent to and in contact with each other, but are not adhesively bonded to one another.

It has been determined that the thickness of the first and third layers, 12 and 14, of thermoplastic material has a great effect on the acoustical properties of the finished laminate structure 10. Therefore, it is desired that the first and third layers, 12 and 14, have a thickness within a range of from approximately 0.15 cm thick to approximately 1.25 cm thick and it is preferred that the thickness be within a range of from approximately 0.30 cm thick to approximately 0.65 cm thick.

The second layer 13 of material is fabricated from a material different from that used for the first layer 12 and third layer 14 to have different acoustical properties. Alternatively, the same material may be used if it has been treated or formed by a process to have different acoustical characteristics from the materials used for the first layer 12 and third layer 14. A preferred material for fabrication of the second layer 13 is polyurethane and specifically a foamed polyurethane. While the material itself is known, its use in the sandwich-like construction of this invention has been found to provide a greater degree of resistance to the transmittal of sound, that is, the laminate structure has enhanced acoustical properties and has increased the noise reduction that can be achieved. It is also possible to use materials such as foamed polystyrene, foamed polyvinyl-chloride and foamed polyethylene, or batts of polypropylene or polyester fibers for the second layer 13. As with the first layer 12 and third layer 14, the thickness of the second layer 13 of thermoplastic material is critical. The thickness of second layer is desired to be within a range of from approximately 0.15 cm to approximately 2.50 cm and it is preferred that the thickness of the second layer 13 be within a range of from approximately 0.30 cm to approximately 1.25 cm.

Second layer 13 is positioned intermediate first layer 12 and third layer 14. It is possible that the layers of material may be placed adjacent to and in contact with one another without bonding the layers to one another and, in such a configuration, a certain amount of sound absorption or reduction may be achieved. However, it has been found that if the three layers of material are adhesively bonded to one another, the acoustical properties of the laminate are greatly enhanced. The adhesive may coat the entire surface area of inner surface 16 and inner surface 17 as well as the surfaces of the second layer of thermoplastic material 13; to provide complete bonding of the three layers of thermoplastic material to one another. While applying the adhesive to the entire surface area of inner surfaces 16 and 17 and the surfaces of second layer 13 to adhesively bond the first layer 12 and third layer 14 to the second layer 13 will produce a laminate having improved accoutiscal properties, it has found to be preferable to apply the adhesive to only a portion of the surface areas to be bonded together such that only a portion of the second layer 13 is bonded to the first layer 12 and third layer 14 and the remainder of the surface area is in contact but not bonded together. When the adhesive is applied to only a portion of the surface area, the portion being from approximately 20% to approximately 60% of the total surface area of each of the surfaces which are to be adhesively bonded, the laminate structure 10 exhibited superior acoustical properties, that is a higher degree of absorption, reduction or attenuation of noise, than was exhibited by the aforementioned laminate in which the entire surface areas were adhesively bonded.

A sheet of paper, fabric or thermoplastic film 21 is adhesively bonded to the outer surface 18 of first layer 12 and a second such sheet 22 is adhesively bonded to the outer surface 19 of third layer 14. Preferably the sheets bonded to outer surface 18 and outer surface 19 are identical; however, it is possible that the sheets may be different. The sheet is preferably Kraft paper having a basis weight in the range of 26 to 42 pounds per 1000 square feet (130–205 g/m$^2$). Other paper or fabric can also be used. In some cases it may be desirable that the sheet comprise a composite for instance of Kraft paper and aluminum foil or of Kraft paper and polymeric film.

This sheet protects the somewhat fragile surface of the foamed material from abrasion and provides durability to the laminate structure. The sheet also provides stiffness so that the laminate structure can be easily handled.

In many cases it may be desirable that a sheet be on both surfaces of the foamed material. Moreover since sheets of polystyrene foam with Kraft paper or thermoplastic film on both surfaces are commercially available, such sheets may be advantageously and economically utilized in this invention. The presence of sheets on both sides of polystyrene foam prevents the thin layers of foamed material from bowing, for instance, due to moisture absorption, when there is a change in environment between the time of fabrication of the foamed material and time of fabrication of the laminate structure.

When the sheet comprises a fabric, it is preferred that the fabric be a spun-bonded, non-woven polyester fabric. While the polyester fabric is preferred, non-woven materials such as non-woven polyester, polypropylene and nylon materials can be used. For instance Cerex ® spun-bonded nylon produced by Monsanto Company can be used. Moreover certain woven materials such as polyesters, polypropylene, polyester-cotton blends, and nylons may also be satisfactory. The fabric can be adhered to the foamed material with a resin. The fabric can be impregnated with a resin which is preferably a synthetic polymer resin chosen for its stability and reproducibility. For this service acrylic resins are preferred although phenolic resins are equally servicable. The acrylic resins are preferred because they contain no formaldehyde and they are thermoplastic so that the curing operation required for phenolic resins is eliminated. The acrylic resins should be capable of withstanding high heat, greater than 75° C., and have a high moisture resistance.

Figure 2:
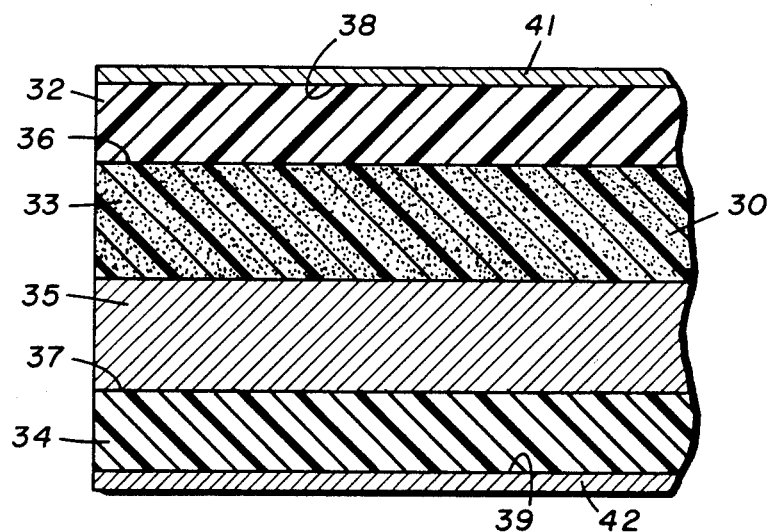

Turning now to FIG. 2, a second embodiment of the laminate structure of this invention is shown. FIG. 2 shows laminate structure 30 which includes many parts identical to those disclosed and discussed in conjunction with laminate structure 10 shown in FIG. 1 and further includes fourth layer 35, a batt of polyester fibers. Laminate structure 30 has a first layer of thermoplastic material 32, a third layer of thermoplastic material 34, and a second layer of material 33 located intermediate the first layer 32 and the third layer 34. These three layers of materials correspond to the first layer 12, third layer 14 and second layer 13 respectively shown in FIG. 1 and discussed hereinabove. The descriptions of the first, second and third layers of material shown in FIG. 1 are equally descriptive of the layers of material used in laminate structure 30. First layer 32 and third layer 34 have inner surfaces 36 and 37 respectively and outer surfaces 38 and 39 respectively. A sheet of paper or fabric 41 is adhesively bonded to the outer surface 38 of first layer 32 and another such sheet 42 is adhesively bonded to the outer surface 39 of third layer 34. The resin impregnated fabrics 41 and 42 correspond to the fabrics 21 and 22 shown in FIG. 1 and the description of those fabrics is equally applicable here. Second layer 33, unlike second layer 13 shown in FIG. 1, is not adhesively bonded to the third layer 34. In addition to the second layer of material 33 located intermediate first and third layers 32 and 34, laminate structure 30 has a fourth layer 35 positioned intermediate the first and third layers 32 and 34. In FIG. 3 second layer 33 is shown adjacent to the inner surface 36 of first layer 32 and fourth layer 35 is adjacent the inner surface 37 of third layer 34; however, the relative positions of the second and fourth layers 33 and 35 may be reversed such that fourth layer 35 will be adjacent first layer 32 and second layer 33 will be adjacent third layer 34. The fourth layer 35, unlike the other layers present in the laminate structure 30, is not a foam material, but is instead a batt of fibers which may be held together by a binder such as a phenolic resin. The batt of fibers is preferably made of polyester fibers but may be made of other fiberous materials. While the batt of fibers is preferred for the fourth layer 35, it is possible to use a fourth layer of foamed thermoplastic material in the laminate structure 30. As in the discussion of the laminate structure 10 shown in FIG. 1, it is preferred that the adjacent surfaces of the four layers 32, 33, 34 and 35, in laminate structure 30 be adhesively bonded together but that they not be adhesively bonded on the entire surface areas. The acoustical properties, the ability to absorb, reduce or attenuate noise, are enhanced if only a portion of each surface is adhesively bonded to the adjacent surface. The adhesively bonded portion of the surfaces should range from approximately 20% to approximately 60% of the surface area and it is preferred that only approximately 35% to approximately 50% of the surface area of each of the surfaces be adhesively bonded to the adjacent surface for the greatest acoustical properties.

The following examples are intended to illustrate specific embodiments and aspects of this invention but are not intended to express any limitation to the breath and scope of the invention.

EXAMPLE 1

This example illustrates a laminate structure according to this invention which has improved acoustical absorption.

A laminate structure was prepared by using two sheets of fabric-faced polystyrene foam as outer layers to a core sheet of polyurethane foam. The fabric-faced polystyrene foam sheets had a thickness of 3.6 millimeters; a non-woven, spunbonded, polyester fabric having a basis weight of 34 grams per square meter was adhesively bonded to the outer surface of each sheet of polystyrene foam which had a density of 55 kilograms per cubic meter. The polyurethane foam core sheet had a thickness of 6.4 millimeters and a density of 18 kilograms per cubic meter. The three sheets were adhesively bonded together.

EXAMPLE 2

This example illustrates the advantageous acoustical absorption properties of the laminate structure of Example 1 when utilized in the construction of building wall partitions to attenuate noise, for instance between rooms or party walls or from outside sources.

A variwety of wall structures were constructed based on modifications of standard wall structure utilizing one-half inch (13 millimeter) paper-faced gypsum wall board nailed to nominal 2"×4" wood stud framing. The following wall structures were constructed:

A. One-half inch sheets of paper-faced gypsum wall board nailed to opposing sides of the framing;
B. Same as A with the laminate structure of Example 1 under one of the gypsum sheets.
C. Same as A with R-11 fiberglass batting between the stud framing.
D. Same as C with the laminate structure of Example 1 under one of the gypsum sheets.
E. Same as A with the laminate structure of Example 1 under both of the gypsum sheets.
F. Same as E with R-11 fiberglass batting between the stud framing.

The testing of sound transmission loss for building partitions was conducted in accordance with the American Society of Testing of Materials (ASTM) Standard E 90-75, "Standard Method for Laboratory Measurement of Airborne Sound Transmission Loss of Building Partitions", incorporated herein by reference. The Sound Transmission Class (STC) of each wall structure was determined in accordance with ASTM E 413-73, "Standard Classification for Determination of Sound Transmission Class", incorporated herein by reference, except that analysis was conducted using octave bands instead of one-third octave bands. The determined sound transmission class, as measured in decibels (dB), for each of the wall structures A through F is shown in Table 1.

TABLE 1

| | Wall Structure Sound Transmission Class | | | |
| | Symbolic Structure* | | | |
| Structure | Wall | Insulation | Wall | STC (dB) |
|---|---|---|---|---|
| A | G | | G | 36 |
| B | G/L | | G | 38 |
| C | G | FG | G | 38 |
| D | G/L | FG | G | 40 |
| E | G/L | | G/L | 41 |
| F | G/L | FG | G/L | 45 |

*G refers to gypsum wallboard; G/L refers to gypsum wallboard over the laminate; FG refers to R-11 fiberglass batting.

The wall structure designated F comprising gypsum wallboard installed over the laminate of Example 1 on both sides of R-11 fiberglass insulated stud framing has a sound transmission class of 45 decibels which advantageously provides acceptable noise attenuation for partitions between separate living areas or between living areas and corridors or public space of average noise. Such noise attenuation has previously generally been achieved by utilizing concrete block walls. By using the laminate structure of this invention building partitions having enhanced sound absorption characteristics can be achieved with substantial economic advantage in building construction.

EXAMPLE 3

This example illustrates the advantageous acoustical absorption properties of the laminate structure of Example 1 when utilized in the flooring construction to attenuate noise in floor-ceiling separations between living areas. Noise attenuation was determined for a floor-ceiling structure comprising a four inch slab of concrete overlayed with successive layers of the laminate of Example 1, ⅝ inch (16 millimeters) plywood and ⅛ inch (3 millimeter) vinyl tile. The laminate of Example 1 was adhesively bonded to the concrete and plywood with a general construction adhesive. All joints between the material were staggered and grout was applied between plywood joints. Twelve inch (30.5 centimeter) square vinyl tiles were adhesively bonded to the top surface of the plywood. The impact insulation class of the floor structure was determined in accordance with ASTM E 492-77, "Standard Method of Laboratory Measurement of Impact Sound Transmission Through Floor-Ceiling Assemblies Using the Tapping Machine", incorporated herein by reference. The floor structure was determined to have an Impact Insulation Class of 51 decibels.

EXAMPLE 4

This example illustrates a further laminate structure according to this invention which has improved acoustical properties.

A laminate structure was prepared by using two sheets of Kraft paper-faced polystyrene foam as outer layers to a core sheet of polyurethane foam. The Kraft paper-faced polystyrene foam sheets had a thickness of 3.0 millimeters. The polyurethane foam core sheet had a thickness of 6.4 millimeters and a density of 18 kilograms per cubic meter. The three sheets were adhesively bonded together.

EXAMPLE 5

This example illustrates the acoustical absorption of the laminate structures of Examples 1 and 4. Acoustical absorption coefficients were determined in accordance with ASTM Standard C 384-77, "Impedance and Absorption of Accoustical Material by the Tube Method" incorporated herein by reference. Average acoustical absorption coefficients determined at frequencies of 500 hertz and 1000 hertz are shown in Table 2.

TABLE 2

| Laminate | Acoustical Absorption Coefficient | |
|---|---|---|
| | 500 $H_3$ | 1000 $H_3$ |
| Example 1 | 0.08 | 0.29 |
| Example 4 | 0.13 | 0.74 |

While specific embodiments of the invention have been described, it should be apparent to those skilled in the art that various modifications thereof can be made without departing from the true spirit and scope of the invention. Accordingly, it is intended that the scope of the following claims cover all such modifications which fall within the full inventive concept.

We claim:

1. A laminate structure with improved acoustical absorption consisting of:
    first and third layers of foamed polystyrene, each of said first and third layers having an inner surface and an outer surface, wherein a sheet of paper is adhesively bonded to at least the outer surfaces of said first and third layers of foamed polystyrene; and
    a second layer of foamed polyurethane, said second layer being intermediate said first and third layers, wherein a portion of said second layer being bonded to said inner surface of said first and third layers of thermoplastic material.

2. The laminate structure of claim 1 wherein said portion of said second layer is adhesively bonded to said inner surfaces of said first and third layers.

3. The laminate structure of claim 2 wherein said adhesively bonded portion of second layer is between approximately twenty percent and approximately sixty percent of the surface area of said second layer.

4. The laminate structure of claim 1 wherein a sheet of paper is adhesively bonded to said inner surface of said first and third layers of foamed polystyrene.

* * * * *